No. 612,647. Patented Oct. 18, 1898.
P. L. HUSSEY.
BALL BEARING.
(Application filed June 6, 1898.)
(No Model.)

Witnesses:

Inventor:
P. L. Hussey,

UNITED STATES PATENT OFFICE.

PATRICK L. HUSSEY, OF DAYTON, OHIO.

BALL-BEARING.

SPECIFICATION forming part of Letters Patent No. 612,647, dated October 18, 1898.

Application filed June 6, 1898. Serial No. 682,680. (No model.)

*To all whom it may concern:*

Be it known that I, PATRICK L. HUSSEY, a citizen of the United States, residing at Dayton, in the county of Montgomery and State of Ohio, have invented certain new and useful Improvements in Ball-Bearings; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to improvements in bicycle-bearings.

The object of the invention is to provide means, hereinafter described, for retaining the balls on the cone when the latter is detached from the hub or spindle sleeve, so that the annoyance of having said balls scatter when the cones are removed is avoided.

Figure 1:
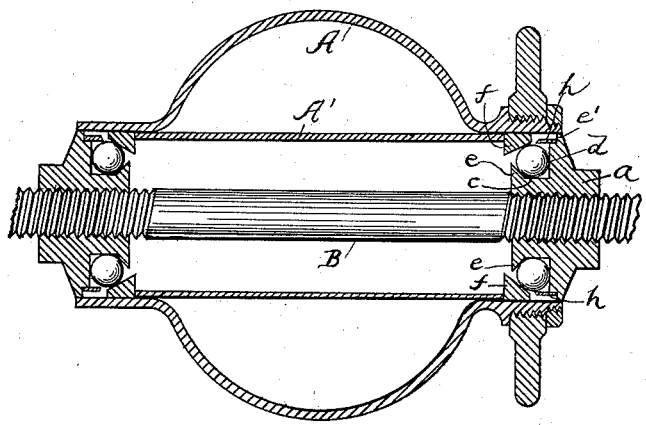
Figure 2:
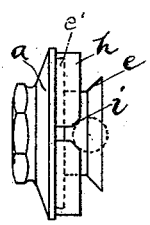
Figure 3:
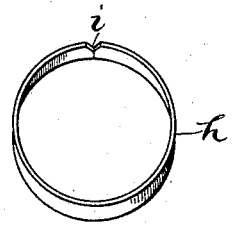

In the accompanying drawings, Figure 1 is a longitudinal mid-sectional view of a hub having my improved bearings applied thereto. Fig. 2 is a view of the improved ball cone and retainer removed from the hub. Fig. 3 is a perspective view of the ball-retainer detached from the cone.

In the drawings I have shown my improvements applied to a spherical hub A of my own invention and which is described and claimed in a pending application filed by myself December 20, 1897, Serial No. 662,536. The improvements may, however, be applied to any other form of hub where the cone screws onto the axle, and are therefore not alone adapted to the form of hub shown.

$a$ designates the main ball-cone, which provides two points of bearing $c$ and $d$ for the balls and the inner end of which terminates in a lip or retaining-flange $e$, the ball-bearing surface of which tapers, as shown. The inner face of the cone, which provides the bearing-point $d$, is flat and has a surrounding annular shoulder $e'$, which receives and holds a ball-retainer consisting of an annular spring $h$, which is cut or slit transversely and has its adjacent ends notched and beveled off on the upper sides, as at $i$, to enable the balls to be pressed into position on the cone. By thus notching the ends of the spring or retainer $h$ and beveling them on the outer surface the balls may be easily placed in position in the cone without necessitating a removal of the retainer. Under a slight pressure of the thumb upon a ball resting on the notched and beveled ends of the retainer the said ends will yield sufficiently to permit each ball to pass into the cone, after which the said ends return to their contracted position around the annular shoulder $e'$, and the balls are prevented from passing out. The circumference of the shoulder $e'$ is greater than the normal circumference of the retaining-spring $h$, so that when the said spring is placed in position on said shoulder the ends thereof will be separated, as is shown in Fig. 2. The dotted circle in the latter figure represents a ball in a position to be pressed by the finger into the ball-race. But slight pressure is required to press said balls into position, after which the retainer $h$ and the lip $e$ hold said balls on the cone and prevent their falling out when said cone is detached. It is conceivable that the spring retainer $h$ might possibly be held in position on the cone by other means than the annular shoulder $e'$; but the latter is thought to be preferable, owing to the facility with which the said retainer may be detached from the cone for the purpose of removing the balls. The cone A is screwed onto the spindle B and enters the end of the hub. An inner cone $f$ provides a third bearing-point for the balls. This cone $f$ in the present application of the invention is maintained in position by a sleeve A', which passes through the spherical hub. The devices above described enable the cone and balls to be kept inseparable, so that they may be dipped together in a small receptacle in cleaning the bearings without the annoyance of having the balls separate and lost, as is commonly the case where the balls are held in the hub.

Having described my invention, I claim—

1. In a ball-bearing for wheels, the combination with an inner cone, of an outer cone having an integral ball-retaining flange on its inner end, and a detachable ball-retainer on its outer bearing-face, the said detachable retainer consisting of a ring of resilient material which is flat throughout its length and has its adjacent ends notched, and tapered on the upper or outer surface, substantially as and for the purposes specified.

2. In a ball-bearing for wheels, the combination with an inner ball-cone $f$, of an outer ball-cone provided with a conical ball-retaining flange on its inner end, and an outer flat ball-bearing surface surrounded by an annular shoulder $e'$, a detachable ball-retainer on said shoulder, the said ball-retainer being flat throughout its length, and of resilient material with its adjacent ends notched and beveled as described so that the balls may be inserted in the cone when the said retainer is in position, as herein specified.

In testimony that I claim the foregoing as my own I hereunto affix my signature in presence of two witnesses.

PATRICK L. HUSSEY.

Witnesses:
R. J. McCarty,
John W. Kalbfus.